US00RE41976E

(19) United States
(12) Reissued Patent
Yamamoto et al.

(10) Patent Number: US RE41,976 E
(45) Date of Reissued Patent: Nov. 30, 2010

(54) SHEET FOLDING APPARATUS

(75) Inventors: Hiroki Yamamoto, Shiga (JP); Tatsuaki Ida, Shiga (JP)

(73) Assignee: Horizon International, Inc., Shiga (JP)

(21) Appl. No.: 12/511,738

(22) Filed: Jul. 29, 2009

Related U.S. Patent Documents

Reissue of:
(64) Patent No.: 7,534,201
Issued: May 19, 2009
Appl. No.: 11/728,418
Filed: Mar. 26, 2007

(30) Foreign Application Priority Data

Mar. 28, 2006 (JP) ..... 2006-087384

(51) Int. Cl.
*B31F 1/10* (2006.01)
*B31F 1/14* (2006.01)

(52) U.S. Cl. ..... 493/421; 493/419; 493/426; 493/440; 493/444

(58) Field of Classification Search ..... 493/419, 493/421, 426, 440, 444
See application file for complete search history.

(56) References Cited

U.S. PATENT DOCUMENTS

| | | | | | |
|---|---|---|---|---|---|
| 2,065,989 | A | * | 12/1936 | Spiess | 493/409 |
| 4,419,088 | A | * | 12/1983 | Nemec | 493/444 |
| 5,667,210 | A | * | 9/1997 | DeLise, Jr. | 270/37 |
| 6,623,415 | B2 | * | 9/2003 | Gates et al. | 493/425 |
| 6,808,480 | B2 | * | 10/2004 | Neubauer et al. | 493/458 |
| 7,022,059 | B2 | * | 4/2006 | Kitai et al. | 493/444 |

FOREIGN PATENT DOCUMENTS

| | | | |
|---|---|---|---|
| EP | 0 356 864 | A2 | 3/1990 |
| EP | 0356864 | * | 3/1990 |
| EP | 1 251 096 | A2 | 10/2002 |
| EP | 1251096 | * | 10/2002 |
| GB | 1205581 | * | 9/1970 |
| JP | 58177852 | * | 10/1983 |

* cited by examiner

*Primary Examiner*—Hemant M Desai
(74) *Attorney, Agent, or Firm*—Kirschstein et al.

(57) ABSTRACT

A sheet conveying section (B) sequentially conveys a sheet (P) from a sheet feeding section (A), and a sheet folding section (D) folds the sheet (P) received from the sheet conveying section (B) in a conveying direction. The sheet conveying section (B) comprises a conveyer belt (3), and a positioning ruler (4) for positioning the sheet (P) while it is conveyed. The sheet folding section (D) comprises a folding knife (9), a pair of folding rollers (10), and first and second guides (11a, 11b) arranged on either side of the folding knife (9). The sheet (p) is positioned to a fold position by the first and second guides (11a, 11b) and folded by the folding knife (9) and the folding roller (10). The positioning ruler (4) is moved in a direction perpendicular to the conveying direction by a first driving mechanism (5, 6). The first and second guides (11a) are moved in the direction perpendicular to the conveying direction respectively by second and third driving mechanisms (21, 22; 23, 24). Control section (32) moves the first and second guides (11a, 11b) in conjunction with the movement of the positioning ruler (4) and moves the second guide (11b) with conjunction with the movement of the first guide (11a) and allows the independent movement of the second guide (11b).

3 Claims, 3 Drawing Sheets

SHEET FOLDING APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a sheet folding apparatus, and more particularly to control of a sheet positioning guide provided in a sheet folding section thereof 2. Description of the Related Art A conventional sheet folding apparatus is provided with a sheet folding section which first folds a sheet in a direction perpendicular to a conveying direction, and next folds the sheet in a direction along the conveying direction. FIG. 3 shows a schematic structure of one example of the sheet folding apparatus.

Referring to FIG. 3, the letter A denotes a sheet feeding section, the letter B denotes a sheet conveying section, the letter C denotes a first sheet folding section, the letter D denotes a second sheet folding section, and the letter E denotes a third sheet folding section.

The sheet feeding section A has a sheet supply table 1 arranged for up-and-down movement and supporting a sheet bundle thereon, and a roller 2 feeding the uppermost sheet P of the sheet bundle on the sheet supply table 1 to the sheet conveying section B one by one. The sheet conveying section B has a conveyer belt 3 conveying the sheet P supplied from the sheet feeding section A to the sheet folding section C, and a positioning ruler 4 arranged parallel with the conveying direction for positioning the sheet P. The conveyer belt 3 is arranged at an angle to the positioning ruler 4, so that the sheet P is conveyed by the conveyer belt 3 while one side of the sheet P being aligned along the positioning ruler 4. The positioning ruler 4 is engaged with a feeding screw 6 driven by a motor 5 for movement in a direction perpendicular to the conveying direction.

The first sheet folding section C folds the sheet P in the direction perpendicular to the conveying direction. The first sheet folding section C has a folding buckle (not shown), and a group of folding rollers 7 extending in the direction perpendicular to the conveying direction. A portion from a leading edge to a fold position of the sheet P is inserted to the folding buckle, and a trailing portion of the sheet P is inserted downward between a pair of folding rollers 7, and the sheet P is folded in the direction perpendicular to the conveying direction. Thereafter, the sheet P is fed to the second sheet folding section D through a gear 8 for applying a perforated line (or a bent line).

The second sheet folding section D folds the sheet P in the direction along the conveying direction. The second sheet folding section D has a folding knife 9 arranged at a position aligning with the gear 8 for up-and-down movement and extending along the conveying direction, a pair of folding rollers 10 arranged beneath the folding knife 9 and extending along the folding knife 9, and a stopper 12 extending in the direction perpendicular to the conveying direction for receiving the leading end of the sheet P delivered from the first sheet folding section C. A position of the stopper 12 is adjustable in the direction along the conveying direction by a belt driving mechanism. The belt driving mechanism has a pair of rollers 30a and 30b extending perpendicularly to the conveying direction and arranged parallel with each other at a spacing therebetween for rotation around the axes thereof. One roller 30a is driven by a motor 13 and endless belts 14 are extended between the opposed end portions of the pair of rollers 30a and 30b through pulleys. Both end portions of the stopper 12 are attached to the endless belt 14, and the position of the stopper 12 can be adjusted in the direction along the conveying direction by the drive of the motor 13. A first guide 11a and a second guide 11b are arranged on either side of the folding knife 9 at a spacing therebetween and parallel with the folding knife 9. The first guide 11a functions as a reference guide for positioning the sheet P in the direction perpendicular to the conveying direction, and the second guide 11b is resiliently biased a spring (not shown) in such a manner that the sheet P pressed by the second guide 11b at its one side and abutted on the first guide 11a at its other side. The first guide 11a and the second guide 11b are detachably mounted to the stopper 12. The sheet P delivered from the first sheet folding section C is stopped by the stopper 12, and is thereafter positioned by the first and second guides 11a and 11b such that the perforated line of the sheet P is aligned with the folding knife 9. Thereafter, the folding knife 9 is moved down, and the sheet P is nipped between the pair of folding rollers 10, folded in the direction along the conveying direction, and fed to the third sheet folding section E.

The third sheet folding section E is arranged adjacent the second sheet folding section D in the direction perpendicular to the conveying direction for folding the sheet P delivered from the second sheet folding section D in the direction along the second conveying direction (the direction perpendicular to the conveying direction from the sheet feeding section A to the second sheet folding section D). The third sheet folding section E has a folding knife 15 arranged for up-and-down movement and extending along the second conveying direction, a pair of folding rollers 16 arranged beneath the folding knife 15 and extending along the folding knife 15, and a stopper 18 extending perpendicularly to the second conveying direction for receiving the leading end of the sheet P delivered from the second sheet folding section D. A position of the stopper 18 is adjustable in the direction along the second conveying direction by a belt driving mechanism. The belt driving mechanism has a pair of rollers 31a and 31b extending perpendicularly to the second conveying direction and arranged parallel with each other at a spacing therebetween for rotation around the axes thereof One roller 31a is driven by a motor 19 and endless belts 20 are extended between the opposed ends of the pair of rollers 31a and 31b through pulleys. Both end portions of the stopper 1 are attached to the endless belts 20, and the position of the stopper 18 can be adjusted in the direction along the conveying direction by the drive of the motor 19. A first guide 17a and a second guide 17b are arranged on either side of the folding knife 15 at a spacing therebetween and parallel with the folding knife 15. The first guide 17a functions as a reference guide for positioning the sheet P in the direction perpendicular to the second conveying direction, and the second guide 17b is resiliently biased by a spring (not shown) in such a manner that the sheet P is pressed by the second guide 17b at its one side and abutted on the first guide 17a at its other side. The first and second guides 17a and 17b are detachably mounted to the stopper 18. The sheet P delivered from the second sheet folding section D is stopped by the stopper 18, and is thereafter positioned by the first and second guides 17a and 17b. Thereafter, the folding knife 15 is moved down, and the sheet P is inserted between a pair of folding rollers 16, folded in the direction along the conveying direction, and discharged from the sheet folding apparatus.

Since the position of the gear 8, the positions of the folding knife 9 and the folding rollers 10 of the second sheet folding section D, and the positions of the folding knife 15 and the folding rollers 16 of the third sheet folding section E are previously fixed when the sheet folding apparatus is actuated, the position of the positioning ruler 4 of the sheet conveying section B is set by driving the motor 5 so as to align the fold position of the sheet with the gear 8 and the folding knife 9 in conformity with a dimension in the direction perpendicular to the conveying direction of the sheet. Next, the first guide 11a of the second sheet folding section D is attached to the stopper 12 so as to be aligned with the set position of the positioning ruler 4, and the second guide 11b is next attached to the stopper 12 so as to be spaced from the first guide 11a at the distance corresponding to the dimension of the sheet in the direction perpendicular to the conveying direction.

Next, the first guide 17a of the third sheet folding section E is attached to the stopper 18 so as to align the fold position of the sheet, which is delivered from the second sheet folding section D, with the folding knife IS, and then the second guide 17b is attached to the stopper 18 so as to be spaced from the first guide 17a at the distance corresponding to the dimension of the sheet in the direction perpendicular to the second conveying direction. Furthermore, the position of the stopper 12 is set by driving the motor 13 of the second sheet folding section D so as to be aligned with the guide 17a of the third sheet folding section E.

After the adjustment of the position of each of the constituent elements, the sheet folding apparatus is actuated, and the sheet P supplied from the sheet feeding section A is guided by the positioning ruler 4 and folded into two in the direction perpendicular to the conveying direction in the first sheet folding section C, is thereafter folded into two in the direction along the conveying direction in the second sheet folding section D, is thereafter fed to the third sheet folding section E in the direction perpendicular to the previous conveying direction, is folded into two in the direction along the conveying direction, and is discharged. In this case, a eight-folded quire is formed in accordance with a series of sheet folding operations.

There is a case that the fold positions of the sheet are out of alignment in the second sheet folding section D and the third sheet folding section E during the sheet folding operation. In this case, it is necessary to adjust the position of the positioning ruler 4 of the sheet conveying section B, the positions of the first and second guides 11a and 11b of the second sheet folding section D, the positions of the first and second guides 17a and 17b of the third sheet folding section E, and the position of the stopper 12 of the second sheet folding section D. However, since there is a risk that a lot of wasted sheets are generated if the adjustment is executed during the operation, in most cases, such adjustment work is executed after temporarily stopping the sheet folding apparatus. Furthermore, there are problems that a lot of labor hour is required for the adjustment work, and an operation efficiency is lowered due to the stop of the sheet folding apparatus.

SUMMARY OF THE INVENTION

Accordingly, it is an object of the present invention is to easily execute an adjustment of positions of a stopper and a guide for positioning a sheet without stopping a sheet folding apparatus when a sheet fold position is out of alignment during the operation of the sheet folding apparatus.

The object can be solved by the following first aspect. In accordance with the first aspect, there is provided a sheet folding apparatus comprising: a sheet feeding section sequentially discharging a sheet from a sheet bundle; a sheet conveying section conveying the sheet fed from the sheet feeding section; and a sheet folding section folding the sheet received from the sheet conveying section in a conveying direction, the sheet conveying section having a conveyer belt arranged at an angle to the conveying direction for conveying the sheet and a positioning ruler arranged parallel with the conveying direction for positioning the sheet while the sheet is conveyed, the sheet folding section having a folding knife extending along the conveying direction, a pair of folding rollers arranged underneath the folding knife and extending along the folding knife, and first and second guides arranged on either side of the folding knife at a spacing therebetween and parallel with the folding knife, whereby the sheet is pressed by the second guide at its one side so as to be abutted on the first guide at its other side so as to be positioned at a fold position, and the sheet is folded by the folding knife and the pair of folding rollers, the sheet folding apparatus characterized by a first driving mechanism moving the positioning ruler in a direction perpendicular to the conveying direction; a second driving mechanism moving the first guide in the direction perpendicular to the conveying direction; a third driving mechanism moving the second guide in the direction perpendicular to the conveying direction; and a control section controlling the first driving mechanism, the second driving mechanism and the third driving mechanism, when the positioning ruler is moved in the direction perpendicular to the conveying direction, the control section moving the first and second guides a distance corresponding to a movement distance of the positioning ruler in the same direction as that of the positioning ruler, and when the positioning ruler is not moved and the first guide is moved in the direction perpendicular to the conveying direction, the control section moving the second guide a distance corresponding to a movement distance of the first guide in the same direction as that of the first guide, and the control section allowing an independent movement of the second guide in the direction perpendicular to the conveying direction.

The object mentioned above can be solved by the following second aspect. In accordance with the second aspect, there is provided a sheet folding apparatus comprising: a sheet feeding section sequentially discharging a sheet from a sheet bundle; a sheet conveying section conveying the sheet fed from the sheet feeding section; and a sheet folding section folding the sheet received from the sheet conveying section in a conveying direction, the sheet conveying section having a conveyer belt arranged at an angle to the conveying direction for conveying the sheet and a positioning ruler arranged parallel with the conveying direction for positioning the sheet while the sheet is conveyed, the sheet folding section having a folding knife extending along the conveying direction, a pair of folding rollers arranged underneath the folding knife and extending along the folding knife, a first stopper extending perpendicularly to the conveying direction and first and second guides and arranged on either side of the folding knife at a spacing therebetween and parallel with the folding knife, whereby the sheet is abutted on the first stopper at its leading edge and pressed by the second guide at its one side so as to be abutted on the first guide at its other side so as to be positioned at a fold position, and the sheet is folded by the folding knife and the pair of folding rollers, the sheet folding apparatus characterized by a first driving mechanism moving the positioning ruler in a direction perpendicular to the conveying direction; and a second driving mechanism moving the first stopper in the conveying direction and the direction perpendicular to the conveying direction, the first and second guides being fixed to the first stopper; a control section controlling the first driving mechanism and the second driving mechanism, when the positioning ruler is moved in the direction perpendicular to the conveying direction, the control section moving the first stopper a distance corresponding to a movement distance of the positioning ruler in the same direction as that of the positioning ruler.

In accordance with a preferable mode of the second aspect, the sheet folding apparatus further comprises: a second sheet folding section arranged adjacent to the sheet folding section in a direction perpendicular to the conveying direction for folding the sheet received from the sheet folding section along a second conveying direction perpendicular to the conveying direction, the second sheet folding section having a second folding knife extending along the second conveying direction, a pair of second folding rollers arranged underneath the second folding knife and extending along the second folding knife, a second stopper extending perpendicularly to the second conveying direction, and third and fourth guides arranged on either side of the second folding knife at a spacing therebetween and parallel with the second folding knife, whereby the sheet is abutted on the second stopper at its leading edge and pressed by the fourth guide at its one side so as to be abutted on the third guide at its other side so as to be positioned at a fold position, and the sheet is folded by the second folding knife and the pair of second folding rollers; and a third driving mechanism moving the second stopper in the second conveying direction and a direction perpendicular to the second conveying direction, the third and fourth guides being fixed to the second stopper, the control section controlling a motion of the third driving mechanism so as to move the second stopper a distance corresponding to a movement distance of the first stopper in the same direction as that of the first stopper at a time when the first stopper is moved in the conveying direction and to allow an independent movement of the second stopper in the second conveying direction.

DETAILED EXPLANATION OF PREFERRED EMBODIMENTS

Figure 1:
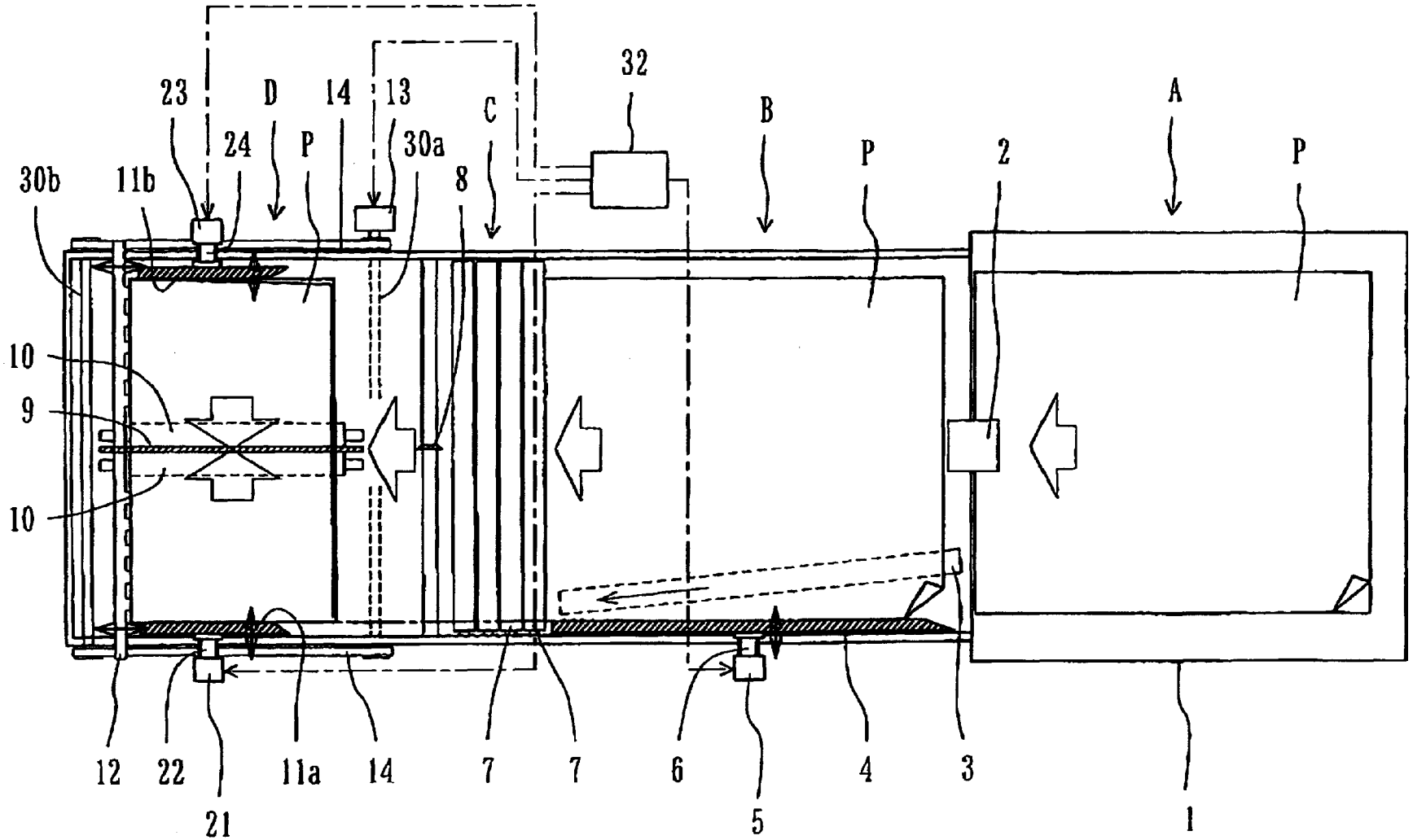
FIG. 1 is a plan view illustrating a schematic structure of a sheet folding apparatus in accordance with an embodiment of the present invention.
Figure 3:
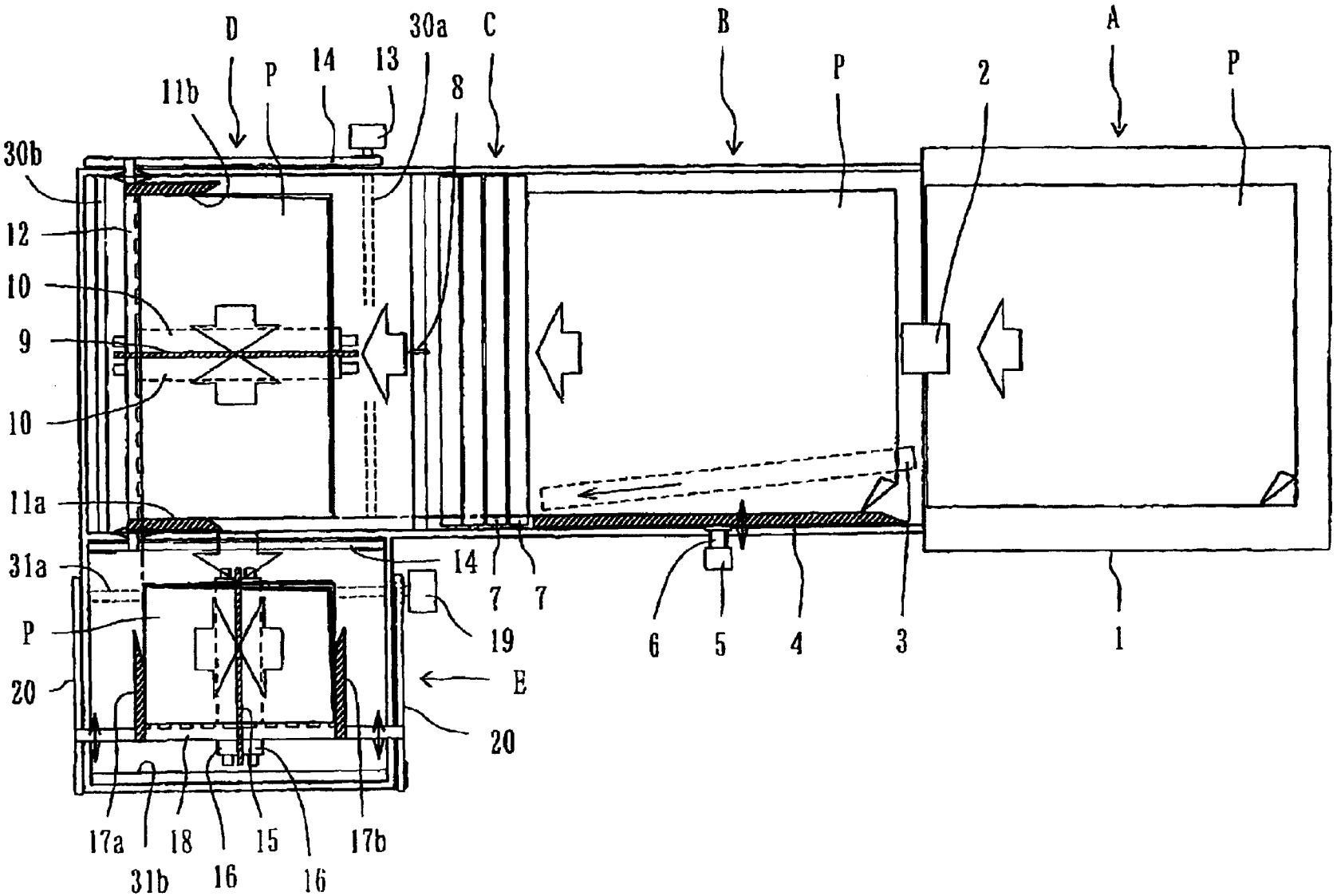
Fig. 3 (Prior Art)
FIG. 3 is a plan view illustrating a schematic structure of a conventional sheet folding apparatus.

Preferable embodiments in accordance with the present invention will be explained below with reference to the accompanying drawings. FIG. 1 is a plan view of a sheet folding apparatus in accordance with a first embodiment of the present invention. In FIG. 1, the same reference numerals as those of FIG. 3 are attached to the constituent elements corresponding to the constituent elements of the sheet folding apparatus shown in FIG. 3.

In FIG. 1, the letter A denotes a sheet feeding section, the letter B denotes a sheet conveying section, the letter C denotes a first sheet folding section, and the letter D denotes a second sheet folding section.

The sheet feeding section A has a sheet supply table 1 arranged for up-and-down movement and supporting a sheet bundle thereon, and a roller 2 discharging the uppermost sheet P of a sheet bundle on the sheet supply table 1 one by one to the sheet conveying section B. The sheet conveying section B has a conveyer belt 3 conveying the sheet P fed from the sheet feeding section A to the sheet folding section C, and a positioning ruler 4 arranged parallel with the conveying direction for positioning the sheet P. The conveyer belt 3 is arranged at an angle to the positioning ruler 4, so that the sheet P is conveyed by the conveyer belt 3 while one side of the sheet P being aligned along the positioning ruler 4. The positioning ruler 4 is engaged with a feeding screw 6 driven by a motor 5 for movement in a direction perpendicular to the conveying direction.

The first sheet folding section C folds the sheet P in the direction perpendicular to the conveying direction. The first sheet folding section C is provided with a folding buckle (not shown), and a group of folding rollers 7 extending in the direction perpendicular to the conveying direction. A portion from a leading edge to a fold position of the sheet P is inserted to the folding buckle, and a trailing portion of the sheet P is inserted downward between a pair of folding rollers 7, and the sheet P is folded in the direction perpendicular to the conveying direction. Thereafter, the sheet P is fed to the second sheet folding section D through a gear 8 for applying a perforated line (or a bent line).

The second sheet folding section D folds the sheet P in the direction along the conveying direction. The second sheet folding section D is provided with a folding knife 9 arranged at a position aligned with the gear 8 for up-and-down movement and extending along the conveying direction, a pair of folding rollers 10 arranged beneath the folding knife 9 and extending along the folding knife 9, and a stopper 12 extending perpendicularly to the conveying direction so as to receive a leading edge of the sheet P fed from the first sheet folding section C. First and second guides 11a and 11b are arranged on either side of the folding knife 9 at a spacing therebetween and parallel with the folding knife 9. The first guide 11a functions as a reference guide for positioning the sheet P in the direction perpendicular to the conveying direction, and the second guide 11b is resiliently biased by a spring (not shown) in such a manner that the sheet P is pressed by the second guide 11b at its one side so as to be abutted on the first guide 11a at its other side. Accordingly, the sheet P delivered from the first sheet folding section C is stopped by the stopper 12, and is thereafter positioned by the first and second guides 11a and 11b in such a manner that the perforated line of the sheet P is aligned with the folding knife 9. Thereafter, the folding knife 9 is moved down, and the sheet P is nipped between a pair of folding rollers 10, and is folded in the direction along the conveying direction.

The position of the stopper 12 is adjustable in the direction along the conveying direction by a belt driving mechanism. The belt driving mechanism has a pair of rollers 30a and 30b extending perpendicularly to the conveying direction and arranged parallel with each other at a spacing therebetween for rotation around the axes thereof One roller 30a is driven by the motor 13 and endless belts 14 are extended between the ends of a pair of rollers 30a and 30b through pulleys. Both end portions of the stopper 12 are attached to the endless belts 14, and a position of the stopper 12 can be adjusted in the direction along the conveying direction by drive of the motor 13. The first guide 11a is engaged with a feeding screw 22 driven by a motor 21 so as to be moved in the direction perpendicular to the conveying direction. The second guide 11b is engaged with a feeding screw 24 driven by a motor 23 so as to be moved in the direction perpendicular to the conveying direction together with the spring for resiliently biasing.

A control section 32 controls the motor 5 and the feeding screw 6 which move the positioning ruler 4 of the sheet conveying section B, the motor 21 and the feeding screw 22 which move the first guide 11a and the motor 24 and the feeding screw 25 which move the second guide 11b of the second sheet folding section D.

The control section 32 moves the first and second guides 11a and 11b a distance corresponding to a movement distance of the positioning ruler 24 in the same direction as the positioning ruler 24 by driving the motors 21 and 23 when the positioning ruler 4 is moved in the direction perpendicular to the conveying direction by the drive of the motor 5, and the control section 32 moves the second guide 11b a distance corresponding to a movement distance of the first guide 11a in the same direction as the first guide 11a by driving the motor 23 when the positioning ruler 4 is not moved and the first guide 11a is moved in the direction perpendicular to the conveying direction by the drive of the motor 5. The control section 32 further allows an independent movement of the second guide 11b in the direction perpendicular to the conveying direction by the drive of the motor 24.

According to the sheet folding apparatus of the present invention, when the fold position is out of alignment in the second sheet folding section D and the adjustment of the positioning ruler 4 is required, the positions of the first and second guides 11a and 11b can be automatically adjusted by moving the positioning ruler 4 by the drive of the motor 5 without stopping the sheet folding apparatus. Furthermore, when the fold position can be corrected by only adjusting the positions of the first and second guides 11a and 11b, the position of the second guide 11b can be automatically adjusted by moving the first guide 11a, and when the fold position can be corrected by only adjusting the position of the second guide 11b, it is possible to move only the second guide 11b. In those cases, it is also possible to correct the fold position without stopping the sheet folding apparatus.

Figure 2:
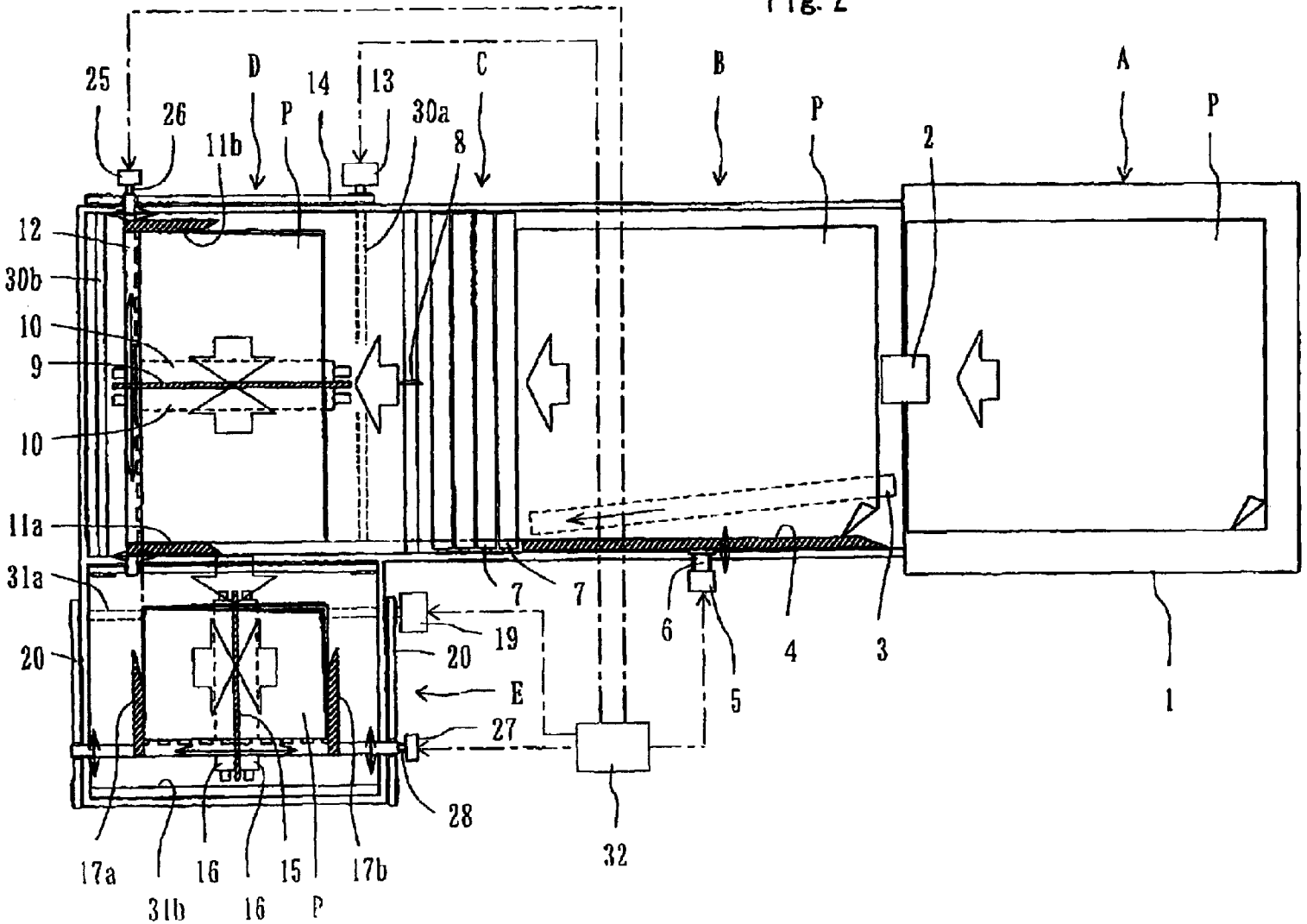
FIG. 2 is a plan view illustrating a schematic structure of a sheet folding apparatus in accordance with the other embodiment of the present invention.

FIG. 2 is a plan view of a sheet folding apparatus in accordance with another embodiment of the present invention. In this case, in FIG. 2, the same reference numerals as those of FIG. 3 are attached to the constituent elements corresponding to the constituent elements of the sheet folding apparatus shown in FIG. 3.

In FIG. 2, the letter A denotes a sheet feeding section, the letter B denotes a sheet conveying section, the letter C denotes a first sheet folding section, the letter D denotes a second sheet folding section, and the letter E denotes a third sheet folding section.

The sheet feeding section A has a sheet supply table 1 arranged for up-and-down movement, and a roller 2 discharging the uppermost sheet P of a sheet bundle placed on the sheet supply table 1 to the sheet conveying section B one by one. The sheet conveying section B has a conveyer belt 3 conveying the sheet P fed from the sheet feeding section A to the sheet folding section C, and a positioning ruler 4 arranged along the conveying direction for positioning the carried sheet P. The conveyer belt 3 is arranged at an angle to the positioning ruler 4, so that the sheet P is conveyed by the conveyer belt 3 while one side of the sheet P being aligned along the positioning ruler 4. The positioning ruler 4 is engaged with a feeding screw 6 driven by a motor 5 for movement in a direction perpendicular to the conveying direction.

The first sheet folding section C folds the sheet P in the direction perpendicular to the conveying direction. The first sheet folding section C is provided with a folding buckle (not shown), and a group of folding rollers 7 extending in the direction perpendicular to the conveying direction. Further, a portion from a leading edge to a fold position of the sheet P is inserted to the folding buckle, and a trailing portion of the sheet P is inserted downward between a pair of folding rollers 7, and the sheet P is folded in the direction perpendicular to the conveying direction, Thereafter, the sheet P is fed to the second sheet folding section D through a gear 8 for applying a perforated line (or a bent line).

The second sheet folding section D folds the sheet P in the direction along the conveying direction. The second sheet folding section D has a first folding knife 9 arranged at a position aligned with the gear 8 for up-and-down movement and extending along the conveying direction, a pair of first folding rollers 10 arranged beneath the first folding knife 9 and extending along the first folding knife 9, and a first stopper 12 extending perpendicularly to the conveying direction so as to receive a leading edge of the sheet P fed from the first sheet folding section C. First and second guides 11a and 11b are arranged on either side of the first folding knife 9 at a spacing therebetween and parallel with the first folding knife 9. The first guide 11a functions as a reference guide for positioning the sheet P in the direction perpendicular to the conveying direction, and the second guide 11b is resiliently biased by a spring (not shown) in such a manner that the sheet P is pressed by the second guide 11b at its one side so as to be abutted on the first guide 11a at its other side. Accordingly, the sheet P delivered from the first sheet folding section C is stopped by the first stopper 12, and is thereafter positioned by the first and second guides 11a and 11b in such a manner that the perforated line of the sheet P is aligned with the first folding knife 9. Thereafter, the first folding knife 9 is moved down, and the sheet P is nipped between a pair of first folding rollers 10, and is folded in the direction along the conveying direction.

The first stopper 12 is attached to a belt driving mechanism driven by a motor 13, and engaged with a feeding screw 26 rotationally driven by a motor 25. The belt driving mechanism has a pair of rollers 30a and 30b extending perpendicularly to the conveying direction and arranged parallel with each other at a spacing therebetween for rotation around the axes thereof. One roller 30a is driven by the motor 13 and endless belts 14 are extended between the opposed ends of a pair of rollers 30a and 30b through pulleys. Both end portions of the stopper 12 are attached to the endless belts 14. Accordingly, a position of the first stopper 12 can be adjusted in the conveying direction by driving the motor 13, and a position of the first stopper 12 can be adjusted in the direction perpendicular to the conveying direction by driving the motor 25.

The first guide 11a and the second guide 11b are detachably mounted to the first stopper 12.

The third sheet folding section E is arranged adjacent to the second sheet folding section D in a direction perpendicular to the conveying direction for folding the sheet P received from the second sheet folding section D along a second conveying direction (a conveying direction perpendicular to the conveying direction from the sheet feeding section A to the second sheet folding section D). The third sheet folding section E has a second folding knife 15 arranged for up-and-down movement and extending along the second conveying direction, a pair of second folding rollers 16 arranged beneath the second folding knife 15 and extending along the second folding knife 15, and a second stopper 18 extending perpendicularly to the second conveying direction so as to receive a leading end of the sheet P delivered from the second sheet folding section D. Third and fourth guides 17a and 17b are arranged on either side of the second folding knife 15 at a spacing therebetween and parallel with the second folding knife 15. The third guide 17a functions as a reference guide for positioning the sheet P in the direction perpendicular to the second conveying direction, and the fourth guide 17b is resiliently biased by a spring (not shown) in such a manner that the sheet P is pressed by the fourth guide 17b at its one side so as to be abutted on the third guide 17a at its other side. Accordingly, the sheet P delivered from the second sheet folding section D is stopped by the second stopper 18, and is thereafter positioned by the third and fourth guides 17a and 17b in such a manner that the perforated line of the sheet P is aligned with the second folding knife 15. Thereafter, the second folding knife 15 is moved down, and the sheet P is nipped between a pair of second folding rollers 16, and is folded in the direction along the second conveying direction.

The second stopper 18 is attached to a belt driving mechanism driven by a motor 19, and engaged with a feeding screw 28 rotationally driven by a motor 27. The belt driving mechanism has a pair of rollers 31a and 31b extending perpendicularly to the second conveying direction and arranged parallel with each other at a spacing therebetween for rotation around the axes thereof. One roller 3 la is driven by the motor 19 and endless belts 20 are extended between the opposed ends of a pair of rollers 31a and 31b through pulleys. Both end portions of the second stopper 18 are attached to the endless belts 20. Accordingly, a position of the second stopper 18 can be adjusted in the second conveying direction by driving the motor 19, and a position of the second stopper 18 can be adjusted in the direction perpendicular to the second conveying direction by driving the motor 27.

The third guide 17a and the fourth guide 17b are detachably mounted to the second stopper 18.

A control section 32 controls the motor 5 and the feeding screw which move the positioning ruler 4 of the sheet conveying section B, the motor 13 and the endless belt 14 which move the first stopper 12, and the motor 25 and the feeding screw 26 which move the first stopper 12 of the second sheet folding section D. The control section 32 further controls the motor 19 and the endless belt 20 which move the second stopper 18, and the motor 27 and the feeding screw 28 which move the second stopper 18 of the third sheet folding section E.

The control section 32 moves the first stopper 12 a distance corresponding to a movement distance of the positioning ruler 4 in the same direction as the positioning ruler 4 by driving the motor 25 when the positioning ruler 4 is moved in the direction perpendicular to the conveying direction by the driving of the motor 5, so that the first and second guides 11a and 11b are moved a distance corresponding to the movement distance of the first stopper 12 in the same direction as the positioning ruler 4. The control section 32 allows an independent movement of the first stopper 12 in the direction perpendicular to the conveying direction by the drive of the motor 25.

The control section 32 moves the second stopper 18 a distance corresponding to a movement distance of the first stopper 12 in the same direction as the first stopper 12 by driving the motor 27 when the positioning ruler 4 is not moved and the first stopper 12 is moved in the conveying direction by the drive of the motor 13, so that the second and third guides 17a and 17b are moved a distance corresponding to the movement distance of the second stopper 18 in the same direction as the first stopper 12. The control section 32 allows an independent movement of the second stopper 18 in the direction perpendicular to the second conveying direction by the drive of the motor 27.

According to the sheet folding apparatus of the present invention, when the fold position is out of alignment in the second sheet folding section D and the adjustment of the positioning ruler 4 is required, the positions of the first and second guides 11a and 11b can be automatically adjusted by moving the positioning ruler 4 by the drive of the motor 5 without stopping the sheet folding apparatus. Furthermore, when the fold position can be corrected by only adjusting the positions of the first guide 11a, the position of the second guide 11b can be automatically adjusted by moving the first guide 11a together with the first stopper 12 by the drive of the motor 25 without stopping the sheet folding apparatus.

In the case that the fold position is out of alignment in the third sheet folding section E, the positions of the third and fourth guides 17a and 17b can be automatically adjusted by only adjusting the position of the first stopper 12 by the drive of the motor 13 without stopping the sheet folding apparatus. In the case that the fold position can be corrected by only adjusting the position of the third guide 17a, the position of the fourth guide 17b can be adjusted by moving the position of the third guide 17a together with the second stopper 18 by the drive of the motor 27 without stopping the sheet folding apparatus.

What is claimed is:

1. A sheet folding apparatus comprising:

a sheet feeding section (A) sequentially discharging a sheet (P) from a sheet bundle; a sheet conveying section (B) conveying the sheet (P) fed from said sheet feeding section (A); and a sheet folding section (D) folding the sheet (P) received from said sheet conveying section (B) in a conveying direction, said sheet conveying section (B) having a conveyer belt (3) arranged at an angle to the conveying direction for conveying the sheet (P) and a positioning ruler (4) arranged parallel with the conveying direction for positioning the sheet (P) while the sheet (P) is conveyed, said sheet folding section (D) having a folding knife (9) extending along the conveying direction, a pair of folding rollers (10) arranged underneath said folding knife (9) and extending along the folding knife, and first and second guides (11a) and (11b) arranged on either side of said folding knife (9) at a spacing therebetween and parallel with said folding knife (9), whereby the sheet (P) is pressed by said second guide (11b) at its one side so as to be abutted on said first guide (11a) at its other side so as to be positioned at a fold position, and the sheet (P) is folded by said folding knife (9) and said pair of folding rollers (10), said sheet folding apparatus characterized by a first driving mechanism (5, 6) moving said positioning ruler (4) in a direction perpendicular to the conveying direction;

a second driving mechanism (21, 22) moving said first guide (11a) in the direction perpendicular to the conveying direction;

a third driving mechanism (23, 24) moving said second guide (11b) in the direction perpendicular to the conveying direction; and a control section (32) controlling said first driving mechanism (5, 6), said second driving mechanism (21, 22) and said third driving mechanism (23, 24), when said positioning ruler (4) is moved in the direction perpendicular to the conveying direction, said control section (32) moving said first and second guides (11a, 11b) a distance corresponding to a movement distance of said positioning ruler (4) in the same direction as that of said positioning ruler (24), and when said positioning ruler (4) is not moved and said first guide (11a) is moved in the direction perpendicular to the conveying direction, said control section (32) moving said second guide (11b) a distance corresponding to a movement distance of said first guide (11a) in the same direction as that of said first guide (11a), and said control section (32) allowing an independent movement of said second guide (11b) in the direction perpendicular to the conveying direction.

2. A sheet folding apparatus comprising:

a sheet feeding section (A) sequentially discharging a sheet (P) from a sheet bundle; a sheet conveying section (B) conveying the sheet (P) fed from said sheet feeding section (A); and a sheet folding section (D) folding the sheet (P) received from said sheet conveying section (B) in a conveying direction, said sheet conveying section (B) having a conveyer belt (3) arranged at an angle to the conveying direction for conveying the sheet (P) and a positioning ruler (4) arranged parallel with the conveying direction for positioning the sheet (P) while the sheet (P) is conveyed, said sheet folding section (D) having a folding knife (9) extending along the conveying direction, a pair of folding rollers (10) arranged underneath said folding knife (9) and extending along the folding knife, a first stopper (12) extending perpendicularly to the conveying direction and first and second guides (11a) and (11b) arranged on either side of said folding knife (9) at a spacing therebetween and parallel with said folding knife (9), whereby the sheet (P) is abutted on said first stopper (12) at its leading edge and pressed by said second guide (11b) at its one side so as to be abutted on said first guide (11a) at its other side so as to be positioned at a fold position, and the sheet (P) is folded by said folding knife (9) and said pair of folding rollers (10), said sheet folding apparatus characterized by a first driving mechanism (5, 6) moving said positioning ruler (4) in a direction perpendicular to the conveying direction; and a second driving mechanism (13, 14, 25, 26, 30a, 30b) moving said first stopper (12) in the conveying direction and the direction perpendicular to the conveying direction, said first and second guides (11a) and (11b) being fixed to said first stopper (12);

a control section (32) controlling said first driving mechanism (5, 6) and said second driving mechanism (13, 14, 25, 26, 30a, 30b), when said positioning ruler (4) is moved in the direction perpendicular to the conveying direction, said control section (32) moving said first stopper (12) a distance corresponding to a movement distance of said positioning ruler in the same direction as that of said positioning ruler (4).

3. The sheet folding apparatus as claimed in claim 2, characterized in that said sheet folding apparatus further comprises:

a second sheet folding section (E) arranged adjacent to said sheet folding section (D) in a direction perpendicular to the conveying direction for folding the sheet (P) received from said sheet folding section (D) along a second conveying direction perpendicular to the conveying direction, said second sheet folding section (E) having a second folding knife (15) extending along the second conveying direction, a pair of second folding rollers (16) arranged underneath said second folding knife (15) and extending along said second folding knife (15), a second stopper (18) extending perpendicularly to the second conveying direction, and third and fourth guides (17a) and (17b) arranged on either side of said second folding knife (15) at a spacing therebetween and parallel with said second folding knife (15), whereby the sheet (P) is abutted on said second stopper (18) at its leading edge and pressed by said fourth guide (17b) at its one side so as to be abutted on said third guide (17a) at its other side so as to be positioned at a fold position, and the sheet (P) is folded by said second folding knife (15) and said pair of second folding rollers (16); and a third driving mechanism (19, 20, 27, 28, 31a, 31b) moving said second stopper (18) in the second conveying direction and a direction perpendicular to the second conveying direction, said third and fourth guides (17a) and (17b) being fixed to said second stopper (18), said control section (32) controlling a motion of said third driving mechanism (19, 20, 27, 28, 3 1a, 31b) so as to move said second stopper (18) a distance corresponding to a movement distance of said first stopper (12) in the same direction as that of said first stopper (12) at a time when said first stopper (12) is moved in the conveying direction and to allow an independent movement of said second stopper (18) in the second conveying direction.

* * * * *